June 15, 1926.

C. B. KLAUS

HEATING APPARATUS

Filed July 10, 1924     5 Sheets-Sheet 1

1,588,587

WITNESSES

INVENTOR
C. B. KLAUS,

BY

ATTORNEYS

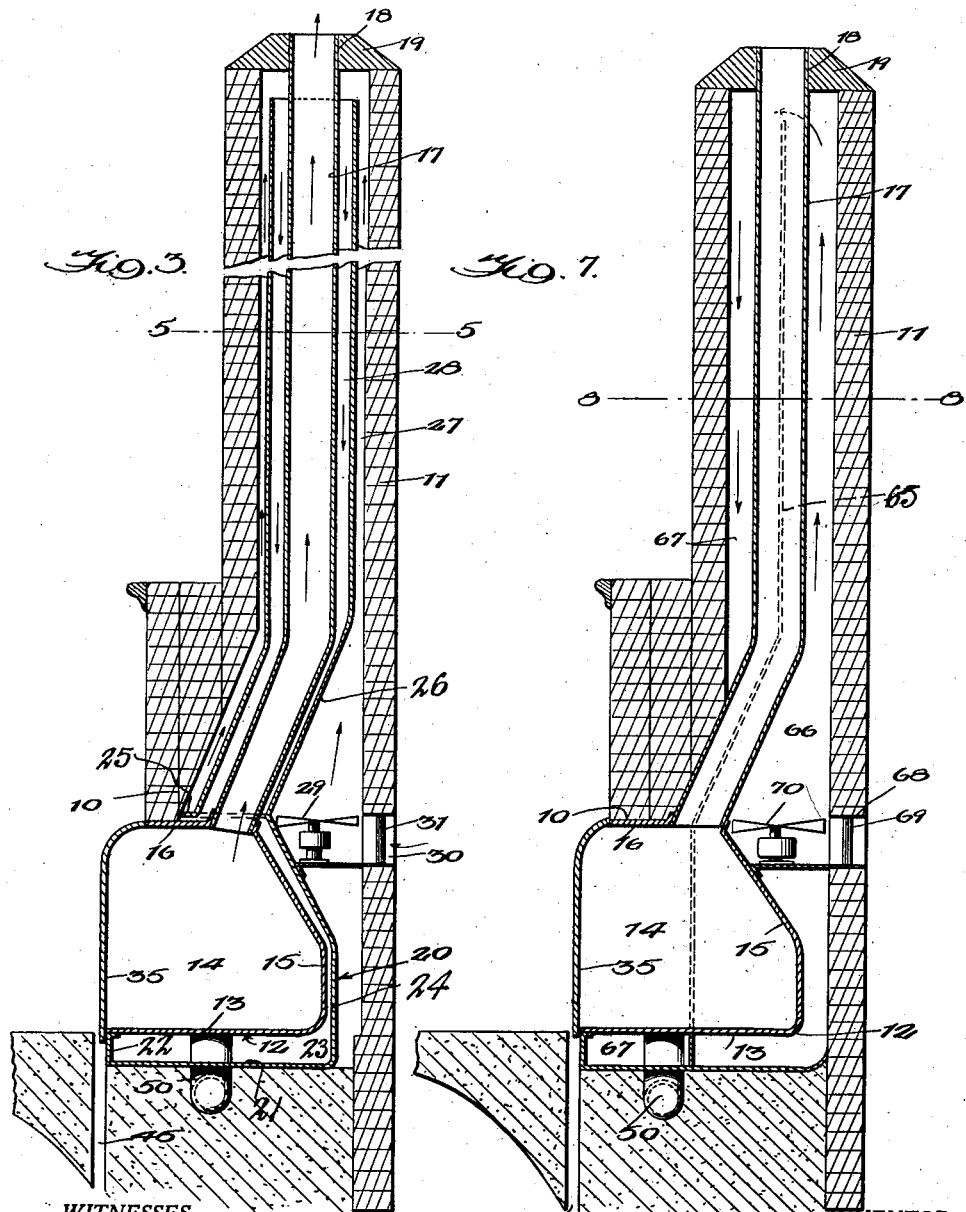

June 15, 1926.  
C. B. KLAUS  
1,588,587
HEATING APPARATUS
Filed July 10, 1924 5 Sheets-Sheet 3
Fig. 5.
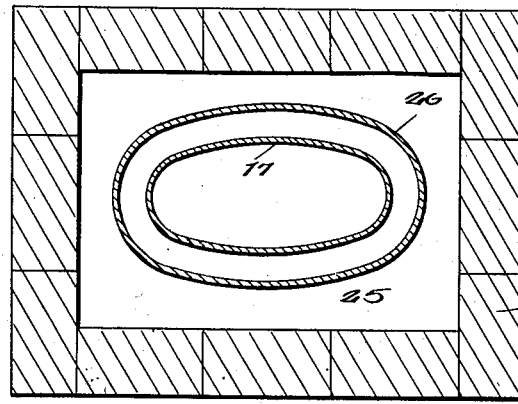
Fig. 6.
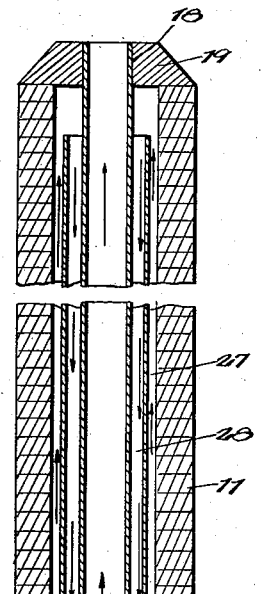
Fig. 8.
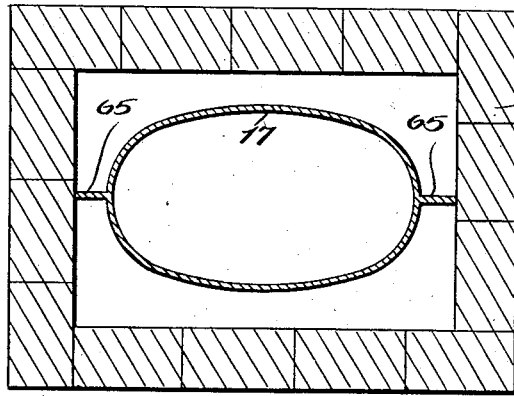
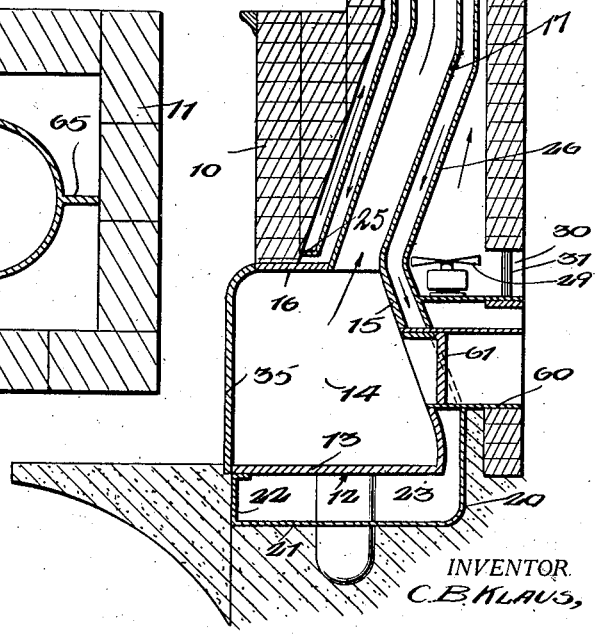
WITNESSES
INVENTOR.
C. B. KLAUS,
BY
ATTORNEYS June 15, 1926.
C. B. KLAUS
1,588,587
HEATING APPARATUS
Filed July 10, 1924    5 Sheets-Sheet 4
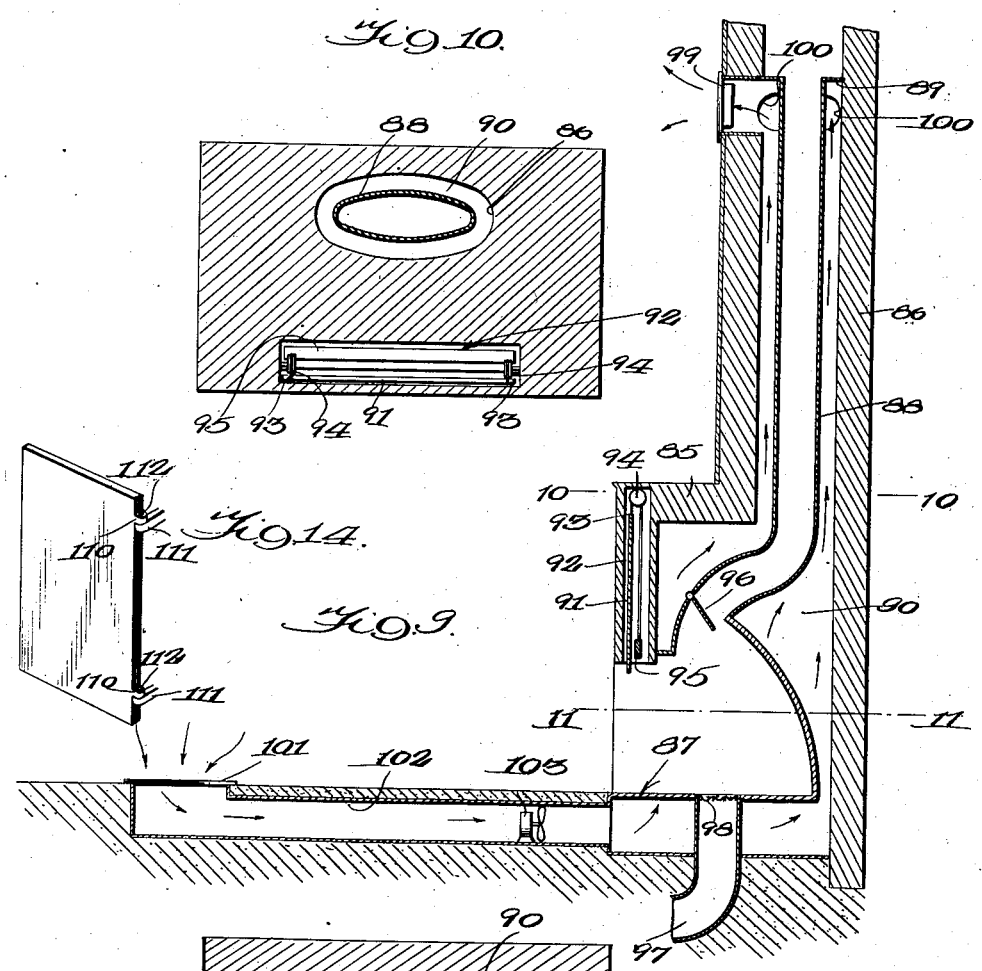
WITNESSES
INVENTOR
C.B. KLAUS,
BY
ATTORNEYS June 15, 1926.
C. B. KLAUS
1,588,587
HEATING APPARATUS
Filed July 10, 1924   5 Sheets-Sheet 5
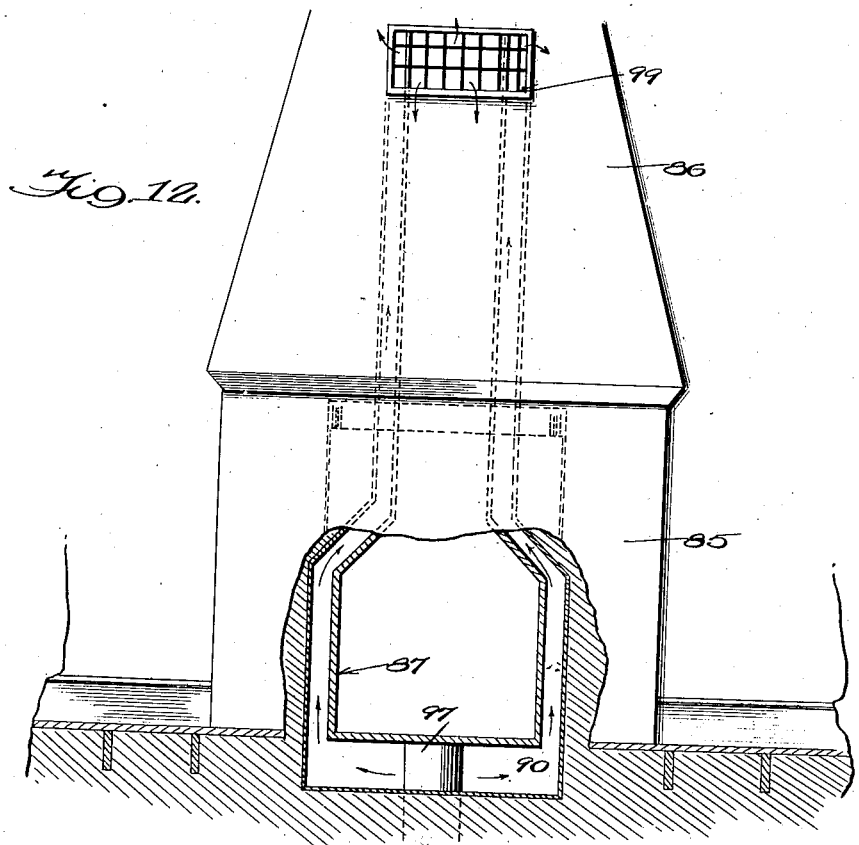
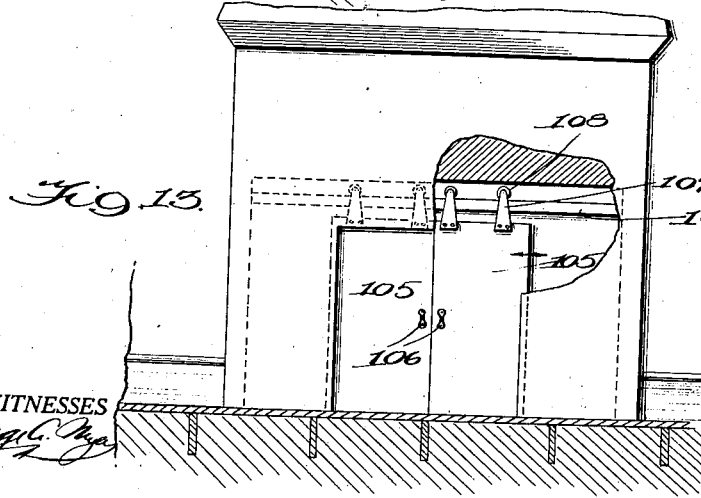

Patented June 15, 1926.

1,588,587

UNITED STATES PATENT OFFICE.

CHARLES B. KLAUS, OF SEATTLE, WASHINGTON.

HEATING APPARATUS.

Application filed July 10, 1924. Serial No. 725,198.

This invention relates to a heating apparatus for use in houses or the like.

The object of the invention is to provide a heating apparatus which combines in the one structure the artistic and æsthetic features of the usual open fireplace and the utilitarian value of a high grade and modern hot air heating plant; which may be converted at will from one to the other, and which when used in either capacity has a heating efficiency superior to that of any similar type now in use.

A further object is to provide a heating apparatus of this character and having the foregoing enumerated advantages and capacities and which is also of attractive and ornamental appearance, which is convenient of access when requiring attention such as refueling, regulating or the like, which has a greater fuel economy and a higher efficiency than that of other types by reason of the utilization of the heat of the chimney gases, the greater part of which goes to waste in the ordinary heating plant, which may be installed on the ground floor thereby saving the cost of constructing a cellar or basement to the house, and which is in general of simple and durable construction, reliable and efficient in operation and easy and comparatively inexpensive to manufacture.

Other objects and advantages of the invention reside in certain novel features of the construction, combination and arrangement of parts which will hereinafter be more fully described and particularly pointed out in the appended claims, reference being had to the accompanying drawings forming part of this specification, and in which:—

Figure 3 is a view in vertical section, taken on line 3—3 of Figure 1;

Figure 5 is a view in horizontal section on line 5—5 of Figure 3;

Figure 6 is a view similar to Figure 3 but showing a slightly modified form;

Figure 7 is a view similar to Figures 3 and 6 but showing a still further modified form;

Figure 8 is a view in horizontal section, taken on line 8—8 of Figure 7;

Figure 9 is a fragmentary view in central transverse vertical section, showing another form of the invention;

Figure 10 is a view in horizontal section, on line 10—10 of Figure 9;

Figure 11 is a similar view, on line 11—11 of Figure 9;

Figure 12 is a fragmentary view in front elevation of the form shown in Figures 9, 10 and 11 with portions broken away and shown in section for the sake of illustration;

Figure 13 is a view in elevation, showing a modified form of the removable front and front mounting, portions being broken away and shown in section for the sake of illustration; and Figure 14 is a fragmentary view in perspective of front mounting.

Figure 1:
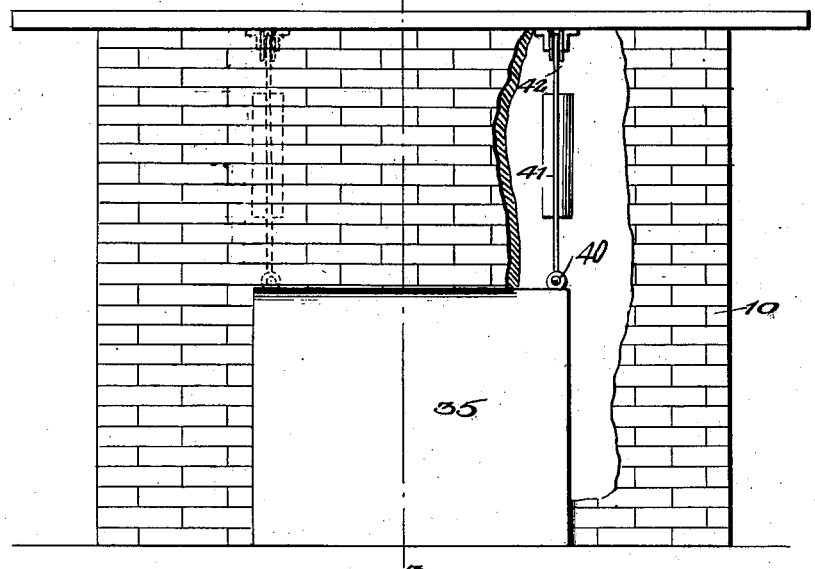
Figure 1 is a view in front elevation of the fireplace having a heating plant installed therein in accordance with the present invention, one form of mounting being shown for the removable front.

Referring to the drawings, it will be seen that the heating apparatus contemplated by the present invention is in all its embodiments especially adapted for use with buildings having fireplaces such as shown at 10 and chimneys such as shown at 11, the interior of the fireplace communicating with the chimney in the usual manner. A fire box, designated generally at 12, is arranged in each fireplace 10, each fire box 12 including a bottom 13, side walls 14, a back wall 15 and a top wall 16. The front of each fire box is open. A smoke pipe 17 has its lower end fitted and secured in an opening provided therefor in the top 16 of its fire box and each smoke pipe extends from its fire box up through its chimney to the atmosphere, the upper end of the smoke pipe being fitted to an opening 18 provided therefor in a cap 19, the cap 19 closing the upper end of its chimney 11.

Figure 2:
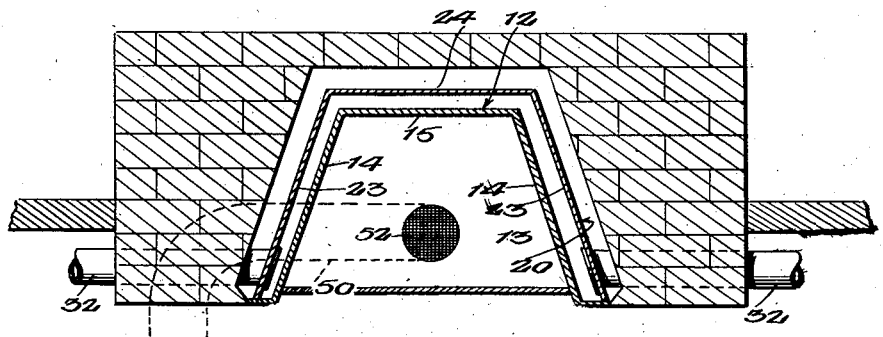
Figure 2 is a view in horizontal section of an arrangement similar to that shown in Figure 1 and taken in a plane just above the bottom of the fire box.
Figure 4:
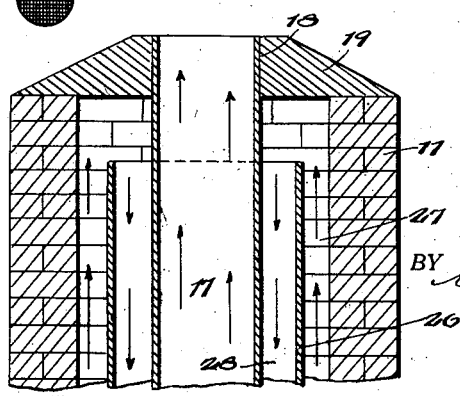
Figure 4 is an enlarged view of the upper end of the device as shown in Figure 3.

In the form of the invention shown in Figures 1 to 6, inclusive, a casing, designated generally at 20 is provided and is arranged to partially encase the fire box 12 and smoke pipe 17. The portion of the casing 20 which partially encases the fire box 12 includes a bottom wall 21 having a short upturned extension 22 at its front end, side walls 23 spaced from the side walls 14 of the fire box and from the opposed portions of the fireplace, a back wall 24 spaced from the back wall 15 of the fire box and from the opposed wall of the fireplace and a top wall 25 which overlies the top wall 16 of the fire box. Above the top wall 25 the casing 20 takes the form of a tubular member 26 which extends up in spaced relation with respect to the smoke pipe and with respect to the chimney to a point adjacent but slightly spaced from the cap 19. In this manner the casing 20 defines with the fire box 12 and smoke pipe 17 and with the fire place 10 and chimney 11 an outer air space 27 and an inner air space 28, the air spaces communicating adjacent the top of the chimney.

Means is provided for forcing air from the atmosphere or exteriorly up through the outer air space 27 and down through the inner air space 28 and this means may comprise a fan 29 actuated by an electric motor or other suitable means and disposed adjacent or in an air inlet 30 which leads from the atmosphere into the outer air space 27 adjacent the lower portion of said air space. Shutters 31 may be provided for the air inlet port if found desirable.

With this arrangement in the embodiments of the invention shown in Figures 1 to 6 the air is drawn in through the inlet 30 and forced up through the outer air space 27 wherein it is warmed to some extent. The warmed air flows from the outer air space 27 into and down through the inner air space 28. While passing through the air space 28 the warm air becomes heated to a considerable degree since it absorbs to a great extent the heat generated by or contained in the products of combustion passing up through the smoke pipe 17. The air space 28 includes not only the space defined by the tubular portion 26 of the casing and the smoke pipe 17 but also the space between the fire box 12 and the lower portion of the casing 20. In the portion of the space 28 defined by the fire box 12 and the lower portion of the casing 20 the air is highly heated and from this space it is proposed to take the air by means of pipes 32 and deliver or distribute it to the points to be heated. The pipes 32 are intended to represent diagrammatically a hot air distributing system which may be of any conventional or standard construction. It is to be understood that in order to enable this operation to be carried out the fire box 12 and smoke pipe 17 and casing 20 are constructed of metal having the requisite degree of heat conductivity so as to provide for an efficient exchange of heat.

In all the embodiments of the invention a removable front, designated generally at 35 is provided. When the apparatus is used as a hot air heating plant, this front 35 is held in place to close the front end of the fire box 12, as shown in the drawings. When it is desired to use the apparatus as a fire place this front 35 is removed and the effect of the fire place is had while the same remains removed. Some of the various means which may be employed for supporting and accommodating the front in its various positions are shown in the several figures of the drawings. In its simplest form the front is merely a flat or suitably shaped piece of metal fitted to form a tight joint with the front of the fire place so as to completely close the same. Such a form is shown in Figures 6 and 14. To remove the front 35 of Figure 6, it is only necessary to remove the bolts or nuts or unfasten the clips or other devices used to hold the same in place and then take the front away from the front of the fire place. In the form of front mounting shown in Figure 1, it is proposed to accommodate the front in a pocket formed in the mantel above the fire box, when the same is not in use, and for this purpose lugs 40 are fixed to the front and connected by chains 41 with counterweights 42, the chains 41 being trained over pulleys 43. The arrangements shown in Figures 3 and 7 are practically the same as those shown in Figure 1 except that the pocket accommodating the front is provided below the fire box and is indicated at 45 and as otherwise noted.

When the apparatus is in use as a heating plant it is necessary to supply air to the fire box 12 since the front of this fire box is closed at such time by the front 35, and for this purpose an air supply pipe 50 is provided. The ends of the pipe 50 are screened, as indicated at 51 and 52, the screened end 51 may be disposed in the dwelling at a suitable point in the floor whereas the screened end 52 is disposed in the bottom wall 13 of the fire box 12. A damper may be provided in the air supply pipe 50. Also a suitable grate may be employed in the fire box 12.

The form of the invention shown in Figure 6 is identical with that shown in Figures 1 to 5 except that the different arrangement is proposed for supplying fuel to the fire box and for gaining access thereto for various purposes. In Figure 6 a tubular member 60 is provided and extends into the back of the chimney and through openings provided therefor in the casing 20 and the back wall 15 of the fire box. A fire door 61 is provided in this tubular member 60. It is to be understood at this point that the fronts 35 may be used as a fire door or that a fire door may be placed in the fronts. These fronts may take various forms, as indicated herein above and they may also consist of folding sections that open out to cover the fire box or that fold back upon themselves when it is desired to use the apparatus as an open fire place.

The form of the invention shown in Figures 7 and 8 is identical with that hereinabove described except in the following particulars: In the form of the invention shown in Figures 7 and 8 the casing 20 is omitted and in lieu of this casing, partitions 65 are provided and extend between opposite points of the smoke pipe 17 and the fire box 12 and the chimney 11 and the fire place structure 10, respectively. These partitions 65 thereby define an outer air space 66 and an inner air space 67. An air inlet 68 affords communication between the lower portion of the outer air space 65 and the atmosphere. Preferably shutters 69 control this communication. An electric fan 70 is provided adjacent the inlet 68 for forcing air up through the space 66 and down through the space 67 and around the fire box. From the portion of the space 67 which lies around the fire box 12 hot air is taken to supply the hot air heating system which as in the other embodiments may include hot air pipes to convey the heat to the rooms to be warmed and a system of return pipes to convey the cooled air back to the heating surfaces. In this manner a more effective hot air heating plant is provided.

In the form shown in Figures 9 to 12 inclusive, a fire place, designated at 85 is provided and has a chimney 86 associated therewith in the usual manner. A fire box 87 of metal is set in the fire box 85 and is closed except at its front and except for the opening which communicates with a smoke pipe 88 leading up through the chimney and through an opening provided therefor in a partition 89. The fire box 87 and smoke pipe 88 define a heating space 90 within the fire place and chimney. The fire place and chimney may be lined with metal if desired. A removable front 91 is provided for the open front of the fire box and is accommodated in a pocket 92 in the mantel when in elevated position, the front being suspended by means of cables 93 trained over pulleys 94 and having a counter-weight 95 connected thereto.

A damper 96 is provided for the smoke pipe 88. In order to supply air to the fire box when the front 92 is down and the device is in use as a hot air heating plant an air supply pipe 97 is provided and leads up through the bottom of the fire box. A screen 98 is positioned in the upper end of the pipe 97. Of course it is to be understood that a grate of any suitable construction may be provided within the fire box.

One form of system which may be employed for distributing and encircling the air in conjunction with this heating apparatus is shown in Figures 9 and 12 and includes a register 99 arranged in the upper part of the room in which the fire place 85 is located and communicating directly with the heating space 90. The register 99 includes the usual shutter or pivoted plates which may be opened or closed in the usual way. In addition to the register 99 other hot air distributing pipes 100 lead from the heating space 90 to the rooms to be heated. As illustrated in Figure 9 these pipes 100 communicate with the upper portion of the heating space 90. In order to provide for the return of the cool air to the lower portion of the heating space 90 a register 101 is provided in the floor of the room in which the fire place is located and controls the inlet of air to an air return duct 102 which communicates with the lower portion of the heating space 90 below the fire box 87. An electric fan 103 may be arranged in the duct 102 and provides a means for positively forcing a supply of cold air into the lower part of the heating space 90. A similar arrangement may be provided for returning the cold air from each of the rooms to be heated.

In Figure 13 a slightly modified form of removable front and front mounting is shown and may be used to advantage with any of the other forms of the invention hereinabove described. In the arrangement shown in Figure 13 the front comprises a pair of sections 105 having handles 106 and suspended by means of hangers 107 and rollers 108 on a rail 109. A variation of this arrangement consists in omitting the hangers 107, rollers 108 and rail 109 and slidably fitting the upper and lower ends of the sections 105 in grooves formed in suitable guides.

Still another form of mounting in shown in Figure 14 and consists in the provision of lugs 110 on one end of a removable front, the lugs 110 being apertured and having their apertures alined with similar apertures in lugs 111 secured to the stationary structure of the fire place. Pins 112 are inserted through the alined apertures. Obviously this arrangement may be employed on both ends of the removable front and this latter arrangement is necessarily required should the front be provided in sections as in Figure 13. With the sectional front supported as shown in Figure 14 some form of fastening device is necessary for releasably securing the meeting edges of the sections to each other.

When the present apparatus is used as an open fireplace an additional air supply is needed for the reason that an open fire place requires a great deal more air than is needed in the fire box of the heating plant, the excess air being drawn in by the naked fire and heated and sent up the chimney. A large part of the heat contained in this excess air is recovered in the inner air space in the present apparatus and the heated air in the inner space is supplied to the rooms of the building for when the apparatus is used as an open fire place the shutters of the air inlet are opened and the air flows through the air inlet up through the outer air space and down through the inner air space into the warm air pipes of the heating systems from whence it flows into the rooms to be heated. Thus in the present apparatus heated air is supplied to the rooms instead of cold air even when the apparatus is used as an open fire place. It follows that the open fire place of the present invention has a much greater heating efficiency than the ordinary open fire place.

I claim:—

1. A heating apparatus for use with building structures having a fire place and a chimney and comprising a fire box set in the fire place and having its front open, a removable front for closing said front, a smoke pipe leading from the fire box up through the chimney, a partition in the chimney and through which the smoke pipe extends, said fire place, chimney, fire box, smoke pipe and partition defining a heating space, means for supplying air to the lower portion of the heating space and a distributing system for conducting air from the upper portion of the heating space.

2. A heating apparatus for use with building structures having an open fireplace and a chimney and comprising a firebox set in the open fireplace and having a bottom wall, side walls, a back wall and a top wall and also having an open front, a removable front for closing the open front of the firebox, whereby the heating apparatus may be converted at will from an ordinary open fireplace into a hot air heating plant, a smoke pipe leading directly from the top wall of the firebox up through the chimney, said smoke pipe having its portion in the chimney straight and direct to provide for the draft essential to an open fireplace.

CHARLES B. KLAUS.